United States Patent
Yu et al.

(10) Patent No.: US 11,396,014 B2
(45) Date of Patent: Jul. 26, 2022

(54) MICROFLUIDIC MOVEMENT CONTROL METHOD UTILIZING LIGHT

(71) Applicant: Fudan University, Shanghai (CN)

(72) Inventors: Yanlei Yu, Shanghai (CN); Jiuan Lv, Shanghai (CN); Jia Wei, Shanghai (CN); Yuyun Liu, Shanghai (CN)

(73) Assignee: Fudan University

( * ) Notice: Subject to any disclaimer, the term of this patent is extended or adjusted under 35 U.S.C. 154(b) by 518 days.

(21) Appl. No.: 16/265,931

(22) Filed: Feb. 1, 2019

(65) Prior Publication Data

US 2019/0232278 A1 Aug. 1, 2019

Related U.S. Application Data

(63) Continuation-in-part of application No. PCT/CN2017/095435, filed on Aug. 1, 2017.

(30) Foreign Application Priority Data

Aug. 2, 2016 (CN) .......................... 201610623513.7

(51) Int. Cl.
*B01L 3/00* (2006.01)
*C08L 27/12* (2006.01)
(Continued)

(52) U.S. Cl.
CPC .............. *B01L 3/50273* (2013.01); *B01L 3/00* (2013.01); *C08G 61/08* (2013.01); *C08L 27/12* (2013.01);
(Continued)

(58) Field of Classification Search
CPC .............. C08G 61/08; C08G 2261/143; C08G 2261/1642; C08G 2261/3323;
(Continued)

(56) References Cited

U.S. PATENT DOCUMENTS

2005/0221281 A1 10/2005 Ho
2011/0272644 A1 11/2011 Remcho

FOREIGN PATENT DOCUMENTS

| CN | 101481440 A | 7/2009 |
| CN | 103087296 A | 5/2013 |
| CN | 104481850 A | 4/2015 |

OTHER PUBLICATIONS

Wang et al (Light Driven Soft Actuators Based on Photoresponsive Polymer Materials, Progress in Chemistry, 2011, 23, 6, pp. 1166-1171, as cited in the IDS dated Feb. 1, 2019 and based on the examiner provided machine translation) (Year: 2011).*

(Continued)

*Primary Examiner* — Benjamin R Whatley
*Assistant Examiner* — Jean Caraballo-Leon
(74) *Attorney, Agent, or Firm* — Calderone Bullock LLC

(57) ABSTRACT

A microfluidic movement control method utilizing light, a device, and a microtubule actuator (2). The microtubule actuator (2) is prepared by utilizing a light-induced deformed smart polymer material. The smart polymer material forms, by an exciting beam, asymmetrical deformation, and is induced to produce a capillary action to drive a microfluid movement. The embodiment can drive microfluids having various polarities and compositions, and can drive creep of the microfluid, and can even drive the microfluid to generate a 3D movement trail. The embodiment has found a wide range of potential applications in controllable microfluidic transport, micro-reaction systems, micro-mechanic systems, IC laboratories, and others.

19 Claims, 3 Drawing Sheets

(51) Int. Cl.
 *C08G 61/08* (2006.01)
 *F16K 99/00* (2006.01)
(52) U.S. Cl.
 CPC .......... *F16K 99/00* (2013.01); *B01L 2300/12* (2013.01); *B01L 2400/0406* (2013.01); *B01L 2400/0481* (2013.01); *B01L 2400/0493* (2013.01); *C08G 2261/143* (2013.01); *C08G 2261/1642* (2013.01); *C08G 2261/3323* (2013.01)
(58) Field of Classification Search
 CPC ...... C08G 2261/3322; C08G 2261/122; C08G 2261/146; C08G 2261/1426; C08G 2261/148; C08G 2261/418; C08L 27/12; B01L 2400/0481; B01L 2300/12; B01L 2400/0406; B01L 2400/0493; B01L 3/50273; B01L 3/00; C08F 232/04; F16K 99/0032; F16K 99/004; F16K 99/00
 See application file for complete search history.

(56) References Cited

OTHER PUBLICATIONS

Jiuan Lv, Photocontrol of Fluid Slugs in Liquid Crystal Polymer Microactuators, Nature, vol. 537, No. 7619, pp. 179-184, (Sep. 7, 2016).
Wei Wang, "Light Driven Soft Actuators Based on Photoresponsive Polymer Materials", Progress in Chemsitry, vol. 23, No. 6, pp. 1166 to 1171 (Jun. 24, 2011).

* cited by examiner

MICROFLUIDIC MOVEMENT CONTROL METHOD UTILIZING LIGHT

CROSS-REFERENCE TO RELATED APPLICATIONS

This application is a continuation-in-part patent application and claims priority under 35 U.S.C. § 120 and 35 U.S.C. § 363 to International PCT Patent Application No. PCT/CN2017/095435, which designates the United States and claims priority under 35 U.S.C. §§ 119(a)-(d) to Chinese Patent Application No. 201610623513.7, the entire disclosures of which are incorporated by reference herein.

FIELD OF THE INVENTION

The invention belongs to the field of microfluidics, in particular to a microchannel actuator for light-controlled microfluidic movement.

DESCRIPTION OF RELATED ART

Precise manipulation of micro-liquid movement has broad industrial applications, such as in biomedical device, micro-liquid transport, microfluidic system, and the like. At present, light-controlled microfluidic movement, especially micro-liquid movement driven by light-induced capillary force, has attracted great research interest from researchers because the non-contact, instantaneity, fixed-point and precise control can be achieved by light control. Liquid movement driven by light depends on two forces: optical force and light-induced capillary force. When the micro-liquid movement is driven by light-induced capillary force, no special optical devices and complicated micro-assembly processes are needed, which greatly simplifies the movement control of the liquid.

Nevertheless, when driving the micro-liquid movement, the light-induced capillary force is subjected to the resistance from the three-phase contact line, which limits the micro-liquid movement to a large extent and seriously restricts its practical application. The light-induced capillary force can be generated by the light-induced wetting gradient or Marangoni effect. The capillary force generated by the light-induced wetting gradient is difficult to overcome the resistance of the three-phase contact line. Therefore, such driving method is only applicable to a specific liquid, and the liquid moves slowly and the movement track is limited to linear movement. The light-induced Marangoni effect often leads to an increase in the temperature of the driven liquid or a need to add a photosensitive surfactant, which is detrimental to the application in the biomedical field or leads to the contamination of the driven liquid.

Therefore, it is necessary to develop a micro-device for light-controlled microfluidic movement with a wide range of applications, easy operation and no pollution to liquid.

BRIEF SUMMARY OF THE INVENTION

An object of the present invention is to provide a microchannel actuator for light-controlled microfluidic movement.

Another object of the present invention is to provide an apparatus for light-controlled microfluidic movement.

Another object of the present invention is to provide a method for light-controlled microfluidic movement.

In the first aspect of the invention, a method for light-controlled microfluidic movement is provided, comprising the steps of:
providing a microchannel actuator (microtubule actuator), wherein the microchannel actuator has an outer diameter of 0.01-2 mm or 0.0012-2 mm and an inner diameter of 0.001-1.99 mm, and the wall material of the channel of the microchannel actuator is a polymer containing an azobenzene or an azo group;
loading a micro-fluid into the microchannel actuator;
illuminating one end of the micro-fluid-loaded microchannel actuator by a light source to drive the micro-fluid to move toward the other end of the microchannel actuator.

In the second aspect of the invention, a method for light-controlled microfluidic movement is provided, comprising the steps of:
providing a microchannel actuator, wherein microchannel actuator has an outer diameter of 0.01-2 mm or 0.0012-2 mm and an inner diameter of 0.001-1.99 mm, and the wall material of the channel of the microchannel actuator is a polymer containing an azobenzene or an azo group;
loading a micro-fluid into the microchannel actuator;
illuminating the micro-fluid-loaded microchannel actuator with light sources of different intensities to drive the micro-fluid to move from the end with high light intensity in the direction of low light intensity.

In another preferred embodiment, the whole or part of the wall material of the channel is a polymer material containing an azobenzene group or an azo group. The channel wall also contain one or more materials other than polymer material containing an azobenzene group or an azo group between the channel and above polymer.

In another preferred embodiment, the microchannel actuator comprises a substrate having a groove and a film, and the groove and the film together form a fluid channel; wherein the substrate and/or the film contain an effective amount of the wall material of the channel.

In another preferred embodiment, the effective amount refers to an amount sufficient to cause deformation of the substrate and/or the film under illumination by a light source.

In another preferred embodiment, the outer diameter of the microchannel actuator is the sum of the width (depth) of the groove and the thickness of the film of the wall material of the channel, and the inner diameter of the microchannel actuator is the width of the groove (depth).

In another preferred embodiment, the microchannel actuator further includes a composite layer wrapped around the inside and/or outside of the channel wall.

In another preferred embodiment, the wall material of the channel is prepared by homopolymerization or copolymerization of CAB monomers, wherein the chemical structure of the monomer CAB is:

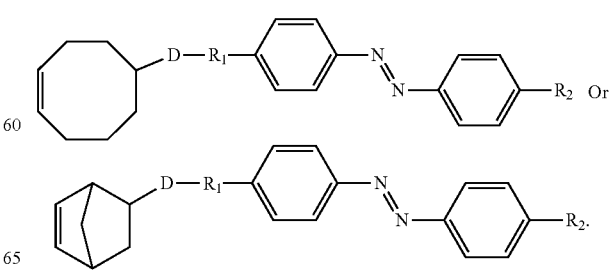

wherein, $R_2$ is H, a C1, C2, C3, C4, C5, or C6 hydrocarbyl or alkoxy, or a terminal group with polarity selected from one of the group consisting of a cyano, an isocyano, a hydroxyl, a halogen, an ester group, a carboxyl, a nitro, an amino and an amide group;

$R_1$ is a C3, C4, C5, C6, C7, C8, C9, C10, C11, or C12 hydrocarbyl or alkoxy;

D is selected from one of the following structure formula (1)-structure formula (4):

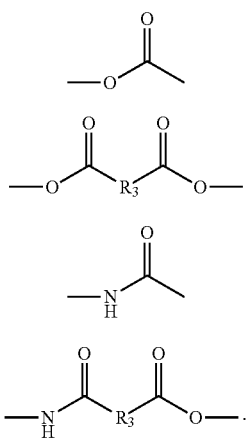

wherein $R_3$ is a C2, C3, C4, C5, or C6 hydrocarbyl or alkoxy; or is not present in the monomer.

In another preferred embodiment, the wall material of the channel is prepared by copolymerizing a CAB monomer with a CF monomer, and the chemical structure formula of the monomer CF is selected from the group consisting of:

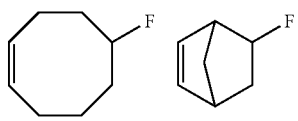

wherein, F represents: -D-$R_1$-G-$R_2$, D, $R_1$ and $R_2$ are the same as the group represented by the chemical formula in CAB, and the structure of G is selected from one or more of the following structures:

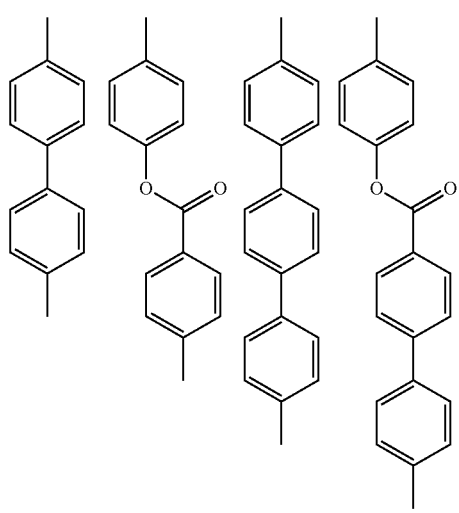

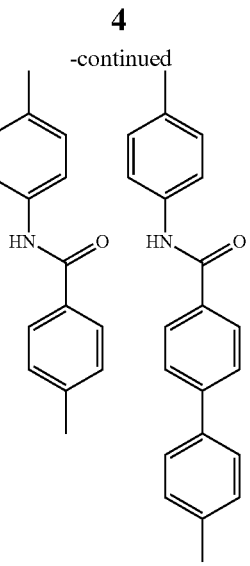

In another preferred embodiment, the wall material of the channel comprises structural units as follows:

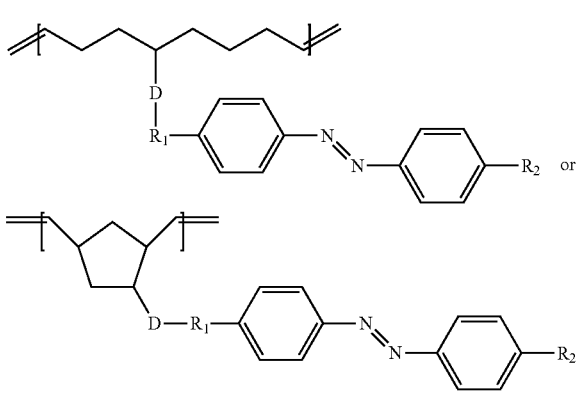

wherein, $R_2$ is H, a C1, C2, C3, C4, C5, or C6 hydrocarbyl or alkoxy, or a terminal group with polarity selected from one of the group consisting of a cyano, an isocyano, a hydroxyl, a halogen, an ester group, a carboxyl, a nitro, an amino and an amide group;

$R_1$ is a C3, C4, C5, C6, C7, C8, C9, C10, C11, or C12 hydrocarbyl or alkoxy;

D is selected from one of the following structure formula (1)-structure formula (4):

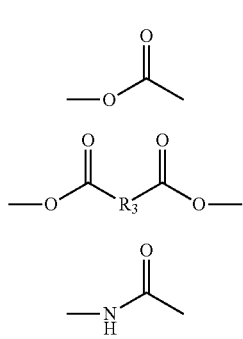

-continued

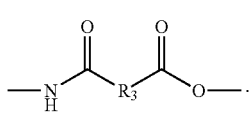

wherein $R_3$ is a C2, C3, C4, C5 or C6 alkylene, alkenylene, alkynylene or an alkyleneoxy group.

In another preferred embodiment, the light sources of different intensities are produced by an attenuator.

In another preferred embodiment, the light sources of different intensities are produced by illuminating the micro-fluid.

In another preferred embodiment, the micro-fluid is a hydrophilic micro-fluid or a hydrophobic micro-fluid.

In another preferred embodiment, when the micro-fluid is a hydrophilic micro-fluid, the inner wall of the microchannel actuator is coated with a hydrophilic coating.

In another preferred embodiment, when the micro-fluid is a hydrophobic micro-fluid, the inner wall of the microchannel actuator is coated with or without a hydrophobic coating.

In another preferred embodiment, the micro-fluid is selected from the group consisting of an organic liquid, water, aqueous solution, gas-liquid fluid, liquid-solid fluid and emulsion.

In another preferred embodiment, the micro-fluid is an organic liquid, preferably an organic liquid selected from the group consisting of silicone oil, n-hexane, petroleum ether, ethyl acetate, acetone, methanol, ethanol, isopropanol, toluene, pentane, octane, cyclohexanone, diethyl ether, propylene oxide, methyl butanone, methyl isobutyl ketone, ethylene glycol monomethyl ether, ethylene glycol monoethyl ether, ethylene glycol monobutyl ether, acetonitrile, pyridine, gasoline and a combination thereof.

In another preferred embodiment, the micro-fluid is an aqueous phase liquid, preferably an aqueous phase liquid selected from the group consisting of water and a salt solution.

In another preferred embodiment, the micro-fluid is a biochemical liquid, preferably a biochemical liquid selected from the group consisting of a protein solution, a phosphate buffer solution, a cell culture fluid, a cytosol and a combination thereof.

In another preferred embodiment, the micro-fluid is a complex fluid, preferably a complex fluid selected from the group consisting of a gas-liquid fluid, emulsion, liquid-solid fluid and a combination thereof.

In another preferred embodiment, the light source is ultraviolet light or visible light.

In another preferred embodiment, the illumination position of the light source is movable.

In another preferred embodiment, the method controls the direction of the microfluidic movement by controlling the direction of movement of the light or the direction of attenuation of the light.

In another preferred embodiment, the micro-fluid moves along the interior of the microchannel actuator as the light moves in a direction along the exterior of the microchannel actuator.

In another preferred embodiment, the micro-fluid is always moved from the end with a high light intensity in the direction in which the light intensity is low, regardless of the change in the direction of attenuation of the light.

In another preferred embodiment, the method adjusts the driving rate of the micro-fluid by controlling the intensity of the light source.

In another preferred embodiment, the light source has a light intensity of 0.01 to 10 W cm$^{-2}$.

In another preferred embodiment, the micro-fluid has a rate of movement of 0-10 mm s$^{-1}$.

In another preferred embodiment, when the light source illuminates the micro-fluid-loaded microchannel actuator, the inner and outer diameters of the channel being illuminated are enlarged to drive the micro-fluid to move toward the thinner end of the microchannel actuator.

In another preferred embodiment, the microchannel actuator is in a straight, serpentine or spiral form.

In another preferred embodiment, the method drives the microfluidic movement over a long distance.

In another preferred embodiment, the method drives a micro-fluid to climb.

In another preferred embodiment, the method drives the micro-fluid to climb at a slope of 0-60 degrees.

In another preferred embodiment, the method drives the micro-fluid to produce a helical three-dimensional movement track.

In the third aspect of the invention, a device for light-controlled microfluidic movement is provided, comprising a light source and a microchannel actuator; wherein the microchannel actuator has an outer diameter of 0.01-2 mm or 0.0012-2 mm, the inner diameter is 0.001 to 1.99 mm, and the wall material of the channel of the microchannel actuator is a polymer material containing an azobenzene or azo group.

In another preferred embodiment, when the micro-fluid is a hydrophilic micro-fluid, the inner wall of the microchannel actuator is coated with a hydrophilic coating.

In another preferred embodiment, when the micro-fluid is a hydrophobic micro-fluid, the inner wall of the microchannel actuator is coated with or without a hydrophobic coating.

In another preferred embodiment, the light source can be moved along the microchannel actuator; and/or an attenuator is placed between the light source and the microchannel actuator.

In another preferred embodiment, the attenuator is used to generate an attenuated light.

In the fourth aspect of the invention, a microchannel actuator for light-controlled microfluidic movement is provided, wherein the microchannel actuator has an outer diameter of 0.01-2 mm or 0.0012-2 mm and an inner diameter of 0.001-1.99 mm, and the wall material of the channel of the microchannel actuator is a polymer material containing an azobenzene or azo group.

In another preferred embodiment, when the micro-fluid is a hydrophilic micro-fluid, the inner wall of the microchannel actuator is coated with a hydrophilic coating.

In another preferred embodiment, when the micro-fluid is a hydrophobic micro-fluid, the inner wall of the microchannel actuator is coated with or without a hydrophobic coating.

In another preferred embodiment, the microchannel actuator is in a straight, serpentine or spiral form.

In another preferred embodiment, the microchannel actuator is circular, rectangular, square, other polygonal or irregular in cross section, preferably circular and square.

In another preferred embodiment, the microchannel actuator is prepared by a method (a) or (b) selected from the group consisting of:

(a) inhaling the azobenzene or azo group-containing polymer material solution into a glass capillary, and etching the glass capillary to obtain a microchannel actuator after the solvent is volatilized;

(b) providing a substrate having a groove and covering the substrate with a film to form a fluid channel thereby obtaining microchannel actuator, wherein one or both of the substrate and the film contain the wall material.

It is to be understood that within the scope of the present invention, each foregoing various technical features of the present invention and each technical feature specifically described hereinafter (eg, in the example) may be combined with each other to constitute a new or preferred technical solution. Due to space limitations, it will not be described one by one here.

DETAILED DESCRIPTION OF THE INVENTION

The inventors have conducted extensive and deep research to prepare a microchannel actuator using a light-induced deformation smart polymer material, the diameter of which can be changed under the stimulation of a light, and the inventors can use light to manipulate the fluid movement in the microchannel. Such microchannel actuator can undergo asymmetric deformation under a light stimulation, inducing capillary forces to drive microfluidic movement. The technique of the present invention can not only drive micro-fluid having various polarities and compositions, but also drive micro-liquid to climb, and even drive liquid to generate a three-dimensional movement track. This is a brand new light-controlled microfluidic apparatus or device with considerable potential applications in controllable microfluidic transport, microreaction systems, micromechanical systems, and lab-on-a-chip. On this basis, the inventors have completed the present invention.

Microchannel Actuator of the Present Invention

Figure 1:
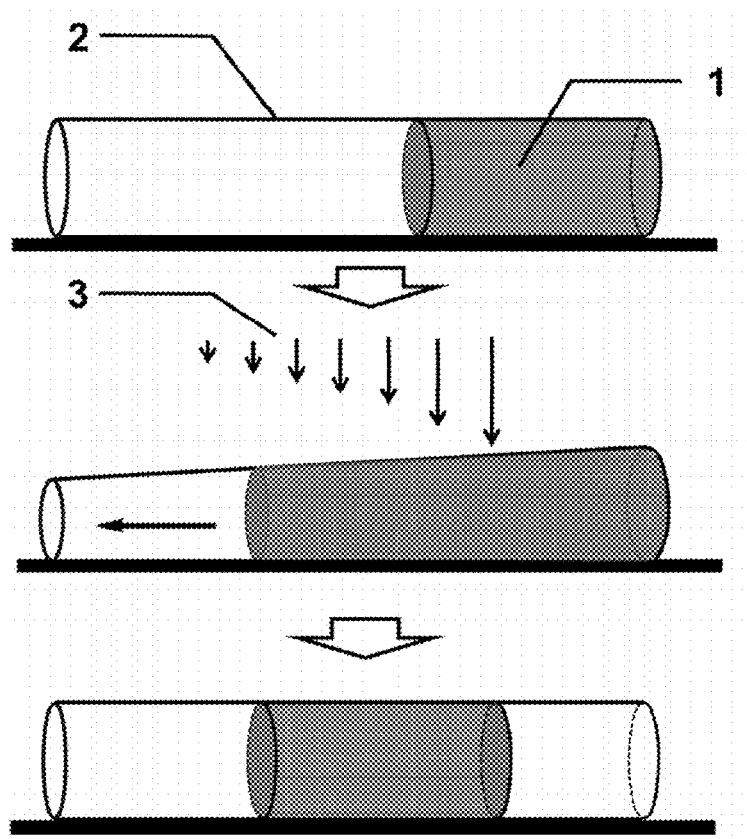
FIG. 1 is a schematic illustration showing a microchannel actuator driving a liquid movement by light-induced deformation. Reference numerals in the figure: 1—driven liquid, 2—microchannel actuator, 3—attenuated light.

The invention provides a microchannel actuator for light-controlled microfluidic movement, and the inventors have prepared the microchannel actuator of the present invention by using a light-induced deformation polymer material containing an azobenzene or azo group, the diameter of which can be changed under the stimulation of a light, thereby manipulating fluid movement in the microchannels. This microchannel actuator undergoes asymmetric deformation under the stimulation of a light, inducing capillary force to drive microfluidic movement. The schematic is shown in FIG. 1.

The microchannel actuator of the present invention has an outer diameter of 0.01-2 mm or 0.0012-2 mm and an inner diameter of 0.001-1.99 mm, and the wall material of the channel of the microchannel actuator is a polymer material containing an azobenzene or azo group.

In another preferred embodiment, the microchannel actuator has an outer diameter of 0.05-2 mm; preferably 0.1-1.9 mm; more preferably 0.5-1.5 mm.

In another preferred embodiment, the microchannel actuator has an outer diameter of 0.0012-2 mm; preferably from 0.005-1.9 mm; more preferably from 0.11-1.5 mm.

In another preferred embodiment, the microchannel actuator has an inner diameter of from 0.001-1.99 mm; preferably from 0.01-1.8 mm; more preferably from 0.1-1.3 mm.

The microchannel actuator can be in a straight, serpentine or spiral form.

The microchannel actuator has a circular, rectangular, square or other polygonal cross section.

The microchannel actuator of the present invention can be used in the light-controlled microfluidic movement. When the micro-fluid is a hydrophilic micro-fluid, the inner wall of the microchannel actuator is coated with a hydrophilic coating. When the micro-fluid is a hydrophobic micro-fluid, the inner wall of the microchannel actuator is coated with or without a hydrophobic coating.

The wall material of the channel of the microchannel actuator is a polymer having a butadiene-ethylene-functional group substituted ethylene ternary alternating polymer or a norbornene as a main chain, and a side chain containing an azobenzene or azo group.

The wall material of the channel of the microchannel actuator is obtained by homopolymerization or copolymerization of CAB monomer or CAB monomer and CF monomer by ring opening metathesis polymerization, and the chemical structure formula of the CAB monomer is:

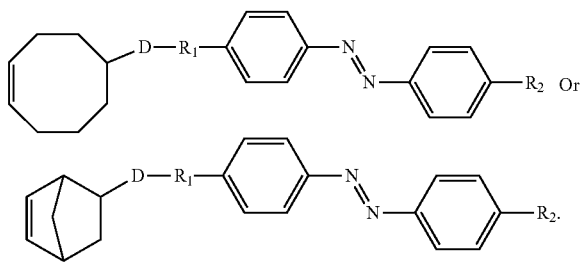

wherein, $R_2$ is H, a C1, C2, C3, C4, C5, or C6 hydrocarbyl or alkoxy, or a terminal group with polarity selected from one of the group consisting of a cyano, an isocyano, a hydroxyl, a halogen, an ester group, a carboxyl, a nitro, an amino, or an amide group;

$R_1$ is a C3, C4, C5, C6, C7, C8, C9, C10, C11, or C12 hydrocarbyl or alkoxy;

D is selected from one of the following structure formula (1)-structure formula

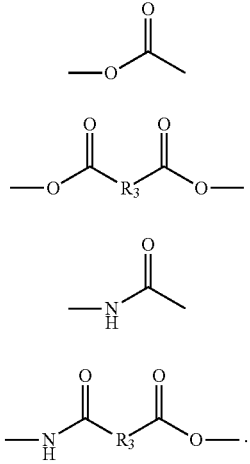

wherein $R_3$ is a C2, C3, C4, C5, or C6 hydrocarbyl or alkoxy;

or is not present in the monomer.

The chemical structure formula of the monomer CF is:

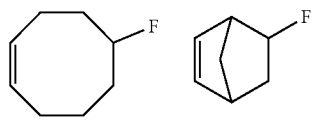

wherein F represents:

-D-$R_1$-G-$R_2$, wherein D, $R_1$ and $R_2$ are the same as those represented by the chemical formula in CAB, and the structure of G is selected from one or more of the following structures:

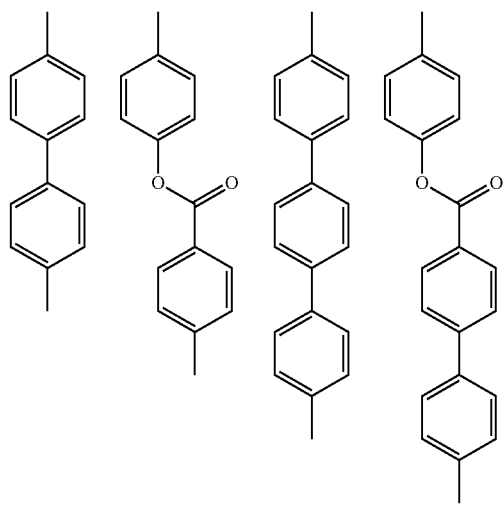

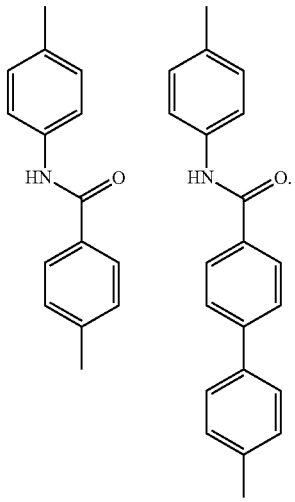

In a preferred embodiment of the invention, the wall material of the channel is preferably of the structure shown below:

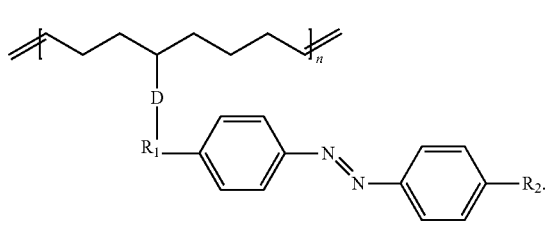

In a preferred embodiment of the invention, the wall material of the channel is preferably of the structure shown below:

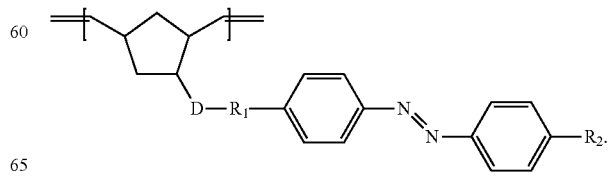

In a preferred embodiment of the invention, the wall material of the channel is preferably of the structure shown below:

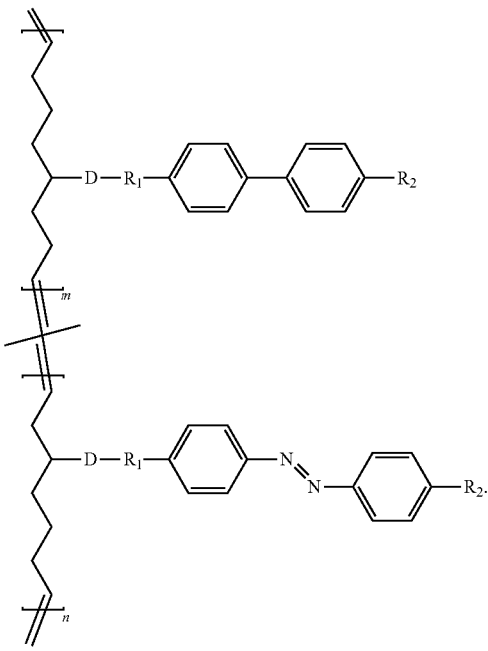

In a preferred embodiment of the invention, the wall material of the channel is preferably of the structure shown below:

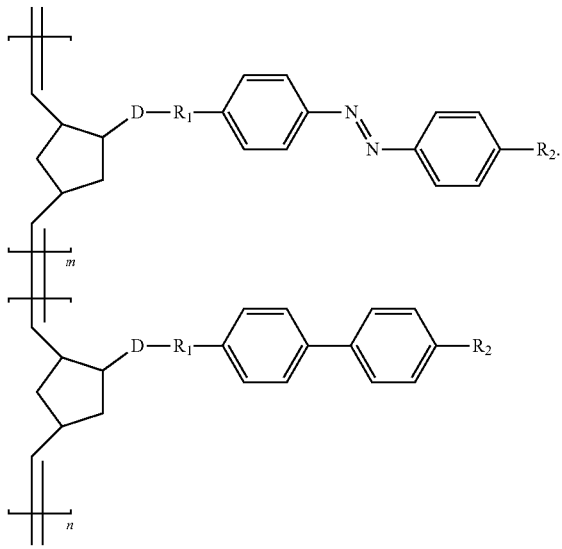

Wherein each group is defined as above.

The method for preparing the wall material of the channel of the microchannel actuator is referred to CN103087296A.

Light-Controlled Microfluidic Movement Device

The invention also provides a device for light-controlled microfluidic movement, comprising a light source and the microchannel actuator of the invention, wherein the microchannel actuator has an outer diameter of 0.01-2 mm or 0.0012-2 mm and an inner diameter of 0.001-1.99 mm, and the wall material of the channel of the microchannel actuator is a polymer material containing an azobenzene or azo group.

When the micro-fluid is a hydrophilic micro-fluid, the inner wall of the microchannel actuator is coated with a hydrophilic coating.

When the micro-fluid is a hydrophobic micro-fluid, the inner wall of the microchannel actuator is coated with or without a hydrophobic coating.

The illumination position of the light source can move along the microchannel actuator.

An attenuator may also be placed between the light source and the microchannel actuator for generating attenuated light.

In the present invention, the "⇩ ⇩ ⇩" or similar illustration is used to indicate the direction of attenuation of light, and both indicate that the light intensity is from strong to weak. Similarly, "⇧ ⇧ ⇧" indicates that the light intensity is from weak to strong.

Method for Light-Controlled Microfluidic Movement

The present invention provides a method for light-controlled microfluidic movement comprising the steps of:

providing a microchannel actuator of the present invention, wherein the microchannel actuator has an outer diameter of 0.01-2 mm or 0.0012-2 mm, an inner diameter of 0.001-1.99 mm, and a material of the channel wall of the microchannel actuator contains an azobenzene or azo group;

loading a micro-fluid into the microchannel actuator;

illuminating one end of the micro-fluid-loaded microchannel actuator with a light source to drive the micro-fluid to move toward the other end of the microchannel actuator.

The present invention provides a method for light-controlled microfluidic movement comprising the steps of:

providing a microchannel actuator of the present invention, wherein the microchannel actuator has an outer diameter of 0.01-2 mm or 0.0012-2 mm, an inner diameter of 0.001-1.99 mm, and a material of the channel wall of the microchannel actuator contains an azobenzene or azo group;

loading a micro-fluid into the microchannel actuator;

illuminating the micro-fluid-loaded microchannel actuator with light sources having different intensities to drive the micro-fluid to move from the end with high light intensity in the direction of low light intensity.

The lights having different intensities can be generated by methods commonly used in the art, and in a preferred embodiment of the invention, the light is produced by an attenuator. In another preferred embodiment, the lights having different intensities can be generated by illuminating one end of the liquid.

The micro-fluid is a hydrophilic micro-fluid or a hydrophobic micro-fluid. When the micro-fluid is a hydrophilic micro-fluid, the inner wall of the microchannel actuator is coated with a hydrophilic coating. When the micro-fluid is a hydrophobic micro-fluid, the inner wall of the microchannel actuator is coated with or without a hydrophobic coating.

The micro-fluid is silicone oil, n-hexane, petroleum ether, ethyl acetate, acetone, methanol, ethanol, water, isopropanol, toluene, pentane, octane, cyclohexanone, diethyl ether, propylene oxide, methyl butanone, methyl isobutyl ketone, ethylene glycol monomethyl ether, ethylene glycol monoethyl ether, ethylene glycol monobutyl ether, acetonitrile, pyridine, gas-liquid fluid, emulsion, liquid-solid fluid, gasoline, biochemical liquid, aqueous solution, and a mixed liquid of the above liquids. Preferably, the micro-fluid is any one of silicone oil, n-hexane, ethyl acetate, acetone, methanol, ethanol, water, isopropanol, gas-liquid fluid, emulsion, liquid-solid fluid, gasoline, biochemical liquid.

The light source is any one of ultraviolet light, visible light, and near-infrared light, or a combination thereof. The illumination position of the light source is movable.

The method controls the direction of microfluidics movement by controlling the direction of movement of the light or the direction of attenuation of the light.

When the light moves in a certain direction along the exterior of the microchannel actuator, the micro-fluid will move along the interior of the microchannel actuator. When an attenuator is used, the micro-fluid always moves in a direction from the end with high light intensity to the end with low light intensity, regardless of the direction of attenuation of the light.

The method adjusts the driving rate of the micro-fluid by controlling the intensity of the light source. The light source has a light intensity of 0.01-10 W cm$^{-2}$ (preferably 0.02-5 W cm$^{-2}$; more preferably 0.03-1 or 0.03-0.5 W cm$^{-2}$). The micro-fluid has a rate of movement of 0-10 mm s$^{-1}$ (preferably 0.001-8 mm s$^{-1}$; more preferably 0.01-6 or 0.01-1 mm s$^{-1}$).

When the light source illuminates the micro-fluid-loaded microchannel actuator, the cross-sectional area of microchannel at the position of illumination will change, thereby driving the micro-fluid to move toward the thinner end of the microchannel actuator.

The microchannel actuator is in a straight, serpentine or spiral form.

The microchannel actuator has a circular, rectangular, square, other polygonal or irregular shape in cross section.

The method is capable of driving microfluidic movement over a long distance, driving microfluidic to climb (which can drive micro-fluid to climb at a slope of 0-60 degrees), and also driving micro-fluid to move with spiral three-dimensional trajectories.

The hydrophilic coating or the hydrophobic coating may be coated with a material commonly used on the market such as polyvinyl alcohol, polyacrylamide, silica sol-gel, or the like.

The advantages of the invention mainly include:

The present invention provides a method for light-controlled microfluidic movement. A light-controlled microchannel actuator is successfully fabricated using an azo-containing liquid crystal polymer, and a capillary force is generated by utilizing changes in the cross-sectional area of the light-induced microchannel actuator, thereby driving the microfluidic movement. This is a new approach for light-driven liquid movement.

This method is suitable for light-controlling various types of microfluidic movement. It not only can handle a variety of non-polar and polar liquids, such as silicone oil, n-hexane, petroleum ether, ethyl acetate, acetone, methanol, ethanol, water, etc., but also manipulate complex fluids such as gas-liquid fluid, emulsion, liquid solid fluid, gasoline, and biochemical liquid.

The method can precisely control the direction and rate of movement of the liquid, even over a long-distance, and can also drive liquid to climb and generate three-dimensional movement track.

The method has great application potential in the fields of microfluidic system, micro-optical mechanical system and the like.

The light-controlled microchannel actuator can be not only a straight microchannel actuator, but also a complex serpentine, spiral microchannel actuator, or a combination thereof.

The invention is further illustrated below in conjunction with specific embodiments. It is to be understood that the examples are for illustrative purposes only and are not intended to limit the scope of the invention. The experimental methods in the following examples which do not specify the specific conditions are usually carried out according to conventional conditions or according to the conditions recommended by the manufacturer. Percentages and parts are by weight unless otherwise stated. As used herein, the singular forms "a," "an," and "the," refer to both the singular as well as plural, unless the context clearly indicates otherwise.

Preparation Example 1 Preparation of Microchannel Actuator

1. Preparation of the Channel Wall Material of the Microchannel Actuator

The structure of this material is shown below.

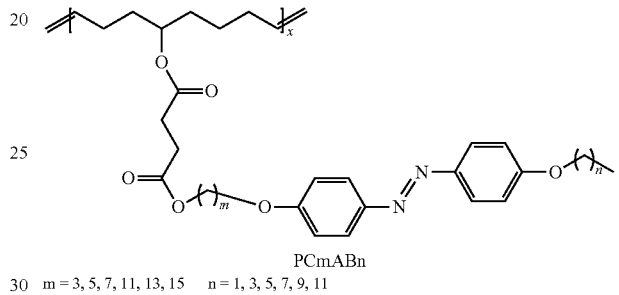

PCmABn m = 3, 5, 7, 11, 13, 15   n = 1, 3, 5, 7, 9, 11

The specific preparation method refers to the procedure of Example 1 of CN103087296A.

2. Preparation of a Straight, Serpentine, and Spiral Microchannel Actuators by Using the Above Wall Material Preparation Steps 2.1 Straight Microchannel Actuator A solution of PCmABn in dichloromethane (0.1-20% by weight) was sucked into a straight glass capillary, and then the capillary filled with the solution was placed in an oven until the solvent was evaporated. The inner wall of the capillary was uniformly covered by PCmABn. The straight capillary coated with PCmABn on the inner wall was placed in hydrofluoric acid to etch away the glass to obtain a straight microchannel actuator.

2.2 Serpentine Microchannel Actuator

A solution of PCmABn in dichloromethane (0.1-20% by weight) was sucked into a serpentine glass capillary, and then the capillary filled with the solution was placed in an oven until the solvent was evaporated. The inner wall of the capillary was uniformly covered by PCmABn. The serpentine capillary coated with PCmABn on the inner wall was placed in hydrofluoric acid to etch away the glass to obtain a serpentine microchannel actuator.

2.3 Spiral Microchannel Actuator

A solution of PCmABn in dichloromethane (0.1-20% by weight) was sucked into a spiral glass capillary, and then the capillary filled with the solution was placed in an oven until the solvent was evaporated. The inner wall of the capillary was uniformly covered by PCmABn. The spiral capillary coated with PCmABn on the inner wall was placed in hydrofluoric acid to etch away the glass to obtain a spiral microchannel actuator.

2.4 Composite Microchannel Actuator

A solution of PCmABn in dichloromethane (0.1-20% by weight) was filled into an EVA (ethylene-vinyl acetate copolymer) hose with an inner diameter of 0.01-1.99 mm and a wall thickness of 0.001-0.2 mm. Then the EVA hose filled with the solution was placed in an oven. After the solvent volatilized, the EVA hose wall was evenly covered with PCmABn to obtain a PCmABn-EVA composite channel actuator.

Results 2.1 The prepared straight microchannel actuator has an inner diameter of 0.001-1.99 mm and an outer diameter of 0.01-2 mm.

2.2 The prepared serpentine microchannel actuator has an inner diameter of 0.001-1.99 mm and an outer diameter of 0.01-2 mm.

2.3 The prepared spiral microchannel actuator has an inner diameter of 0.001-1.99 mm and an outer diameter of 0.01-2 mm.

2.4 The prepared composite microchannel actuator has an inner diameter of 0.001-1.99 mm and an outer diameter of 0.01-2 mm.

Preparation Example 2 Preparation of Microchannel Actuator

1. Preparation of the Channel Wall Material of the Microchannel Actuator

The structure of this material is shown below.

added to initiate polymerization. After 10 hr, the polymerization was terminated using vinyl ether to obtain P(CmABn)x(CpBPq)y.

2. Preparation of a Straight, Serpentine, Y-Shaped and Composite Microchannel Actuators by Using the Above Wall Material Preparation Steps 2.1 Straight Microchannel Actuator A solution of P(CmABn)x(CpBPq)y in dichloromethane (0.1-30% by weight) was sucked into a straight glass capillary, and then the capillary filled with the solution was placed in an oven until the solvent was evaporated. The inner wall of the capillary was uniformly covered by P(CmABn)x(CpBPq)y. The straight capillary coated with P(CmABn)x(CpBPq)y on the inner wall was placed in hydrofluoric acid to etch away the glass to obtain a straight microchannel actuator.

2.2 Serpentine Microchannel Actuator

A solution of P(CmABn)x(CpBPq)y in dichloromethane (0.1-30% by weight) was sucked into a serpentine glass capillary, and then the capillary filled with the solution was placed in an oven until the solvent was evaporated. The inner wall of the capillary was uniformly covered by P(CmABn)x(CpBPq)y. The serpentine capillary coated with P(CmABn)x(CpBPq)y on the inner wall was placed in hydrofluoric acid to etch away the glass to obtain a serpentine microchannel actuator.

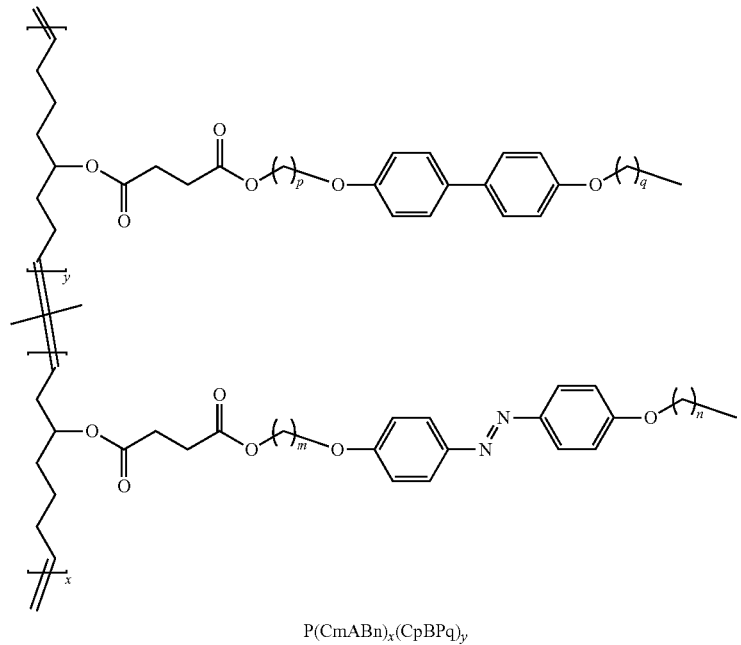

P(CmABn)$_x$(CpBPq)$_y$ m = 3, 5, 7, 11, 13, 15   n = 1, 3, 5, 7, 9, 11
p = 3, 5, 7, 11, 13, 15   q = 1, 3, 5, 7, 9, 11

The specific preparation method refers to the procedure of Example 1 of CN103087296A.

M mole of CF monomer was mixed with n mole of CAB monomer in a Schlenk flask, and a sufficient amount of dichloromethane was added to dissolve them. At 40° C., a certain amount of Grubbs second generation catalyst was 2.3 Y-Shaped Microchannel Actuator A solution of P(CmABn)x(CpBPq)y in dichloromethane (0.1-30% by weight) was sucked into a Y-shaped glass capillary, and then the capillary filled with the solution was placed in an oven until the solvent was evaporated. The inner wall of the capillary was uniformly covered by P(CmABn)x(CpBPq)y. The spiral capillary coated with P(CmABn)x (CpBPq)y on the inner wall was placed in hydrofluoric acid to etch away the glass to obtain a Y-shaped microchannel actuator.

2.4 Composite Microchannel Actuator

A solution of P(CmABn)x(CpBPq)y obtained in preparation example 2 in dichloromethane (0.1-20% by weight) was filled into an EVA (ethylene-vinyl acetate copolymer) hose with an inner diameter of 0.01-1.99 mm and a wall thickness of 0.001-0.2 mm. Then the EVA hose filled with the solution was placed in an oven. After the solvent volatilized, the EVA hose wall was evenly covered with P(CmABn)x(CpBPq)y to obtain a P(CmABn)x(CpBPq)y-EVA composite channel actuator.

Preparation Example 3 Preparation of Microchannel Actuator

1. Preparation of the Channel Wall Material of the Microchannel Actuator

The structure of this material is shown below.

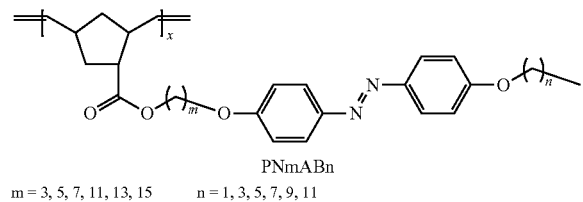

PNmABn
m = 3, 5, 7, 11, 13, 15   n = 1, 3, 5, 7, 9, 11

The specific preparation method refers to the procedure of Example 1 of CN103087296A.

A certain molar amount of the azo group-containing norbornene monomer CAB was added to the Schlenk flask, and a sufficient amount of methylene chloride was added to dissolve it. A certain amount of Grubbs second generation catalyst was added at 40° C. to initiate polymerization. After 10 hours, the polymerization was terminated using vinyl ethyl ether to obtain PNmABn.

2. Preparation of a Straight, Serpentine, and Y-Shaped Microchannel Actuator by Using the Above Wall Material Preparation Steps 2.1 Straight Microchannel Actuator A solution of PNmABn in dichloromethane (0.1-30% by weight) was sucked into a straight glass capillary, and then the capillary filled with the solution was placed in an oven until the solvent was evaporated. The inner wall of the capillary was uniformly covered by PNmABn. The straight capillary coated with PNmABn on the inner wall was placed in hydrofluoric acid to etch away the glass to obtain a straight microchannel actuator.

2.2 Serpentine Microchannel Actuator

A solution of PNmABn in dichloromethane (0.1-30% by weight) was sucked into a serpentine glass capillary, and then the capillary filled with the solution was placed in an oven until the solvent was evaporated. The inner wall of the capillary was uniformly covered by PNmABn. The serpentine capillary coated with PNmABn on the inner wall was placed in hydrofluoric acid to etch away the glass to obtain a serpentine microchannel actuator.

2.3 Y-Shaped Microchannel Actuator

A solution of PNmABn in dichloromethane (0.1-30% by weight) was sucked into a Y-shaped glass capillary, and then the capillary filled with the solution was placed in an oven until the solvent was evaporated. The inner wall of the capillary was uniformly covered by PNmABn. The spiral capillary coated with PNmABn on the inner wall was placed in hydrofluoric acid to etch away the glass to obtain a Y-shaped microchannel actuator.

Example 1

Microfluidic Movement Driven by Microchannel Actuator Through Light-Induced Asymmetric Deformation The straight microchannel actuators (inner diameter 0.5 mm, outer diameter 0.51 mm) prepared in Preparation Examples 1, 2, and 3 were fixed on a horizontal table top. A small amount of fluid such as silicone oil, ethyl acetate, ethylene glycol monobutyl ether or emulsion was sucked into the microchannel actuator by capillary action. A light source was placed above the microchannel actuator with an attenuator placed in the middle for generating attenuated light. The light source was turned on, and the intensity of the light source was 125-140 mW cm$^{-2}$.

Figure 2:
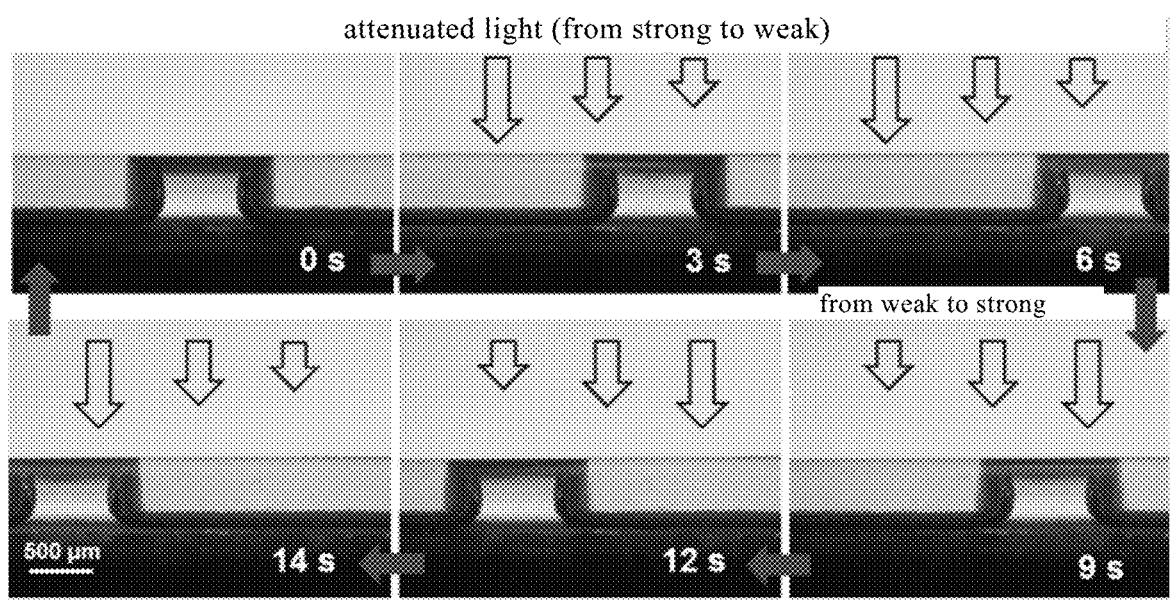
FIG. 2 shows that a straight microchannel actuator drives microfluidic movement under stimulation from an attenuated light.

Results:

An asymmetrical deformation was generated in the straight microchannel actuator, thereby driving the liquid to move in the direction of light attenuation. The movement process is shown in FIG. 2 (see the movement process from 0 seconds to 3 seconds to 6 seconds).

Figure 8:
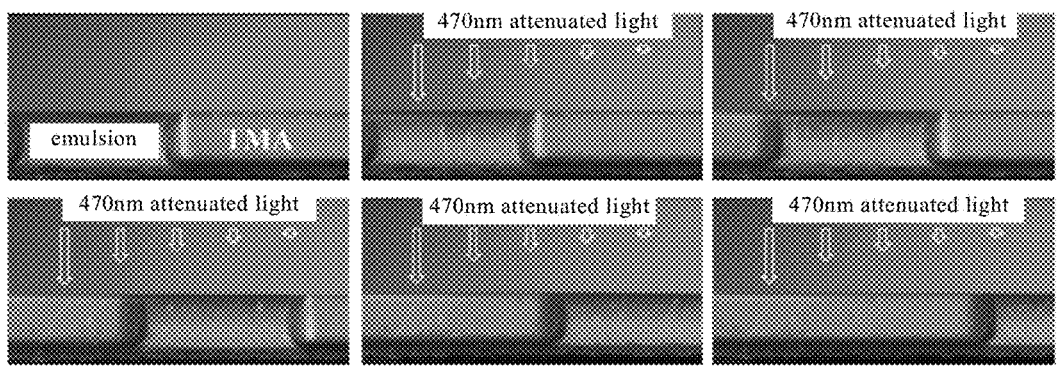
FIG. 8 shows that the straight microchannel actuator drives the movement of a complex fluid, such as an emulsion under the stimulation of an attenuated light.

The process of driving the emulsion is shown in FIG. 8.

A schematic diagram of the entire process is shown in FIG. 1.

Example 2

Microchannel Actuator Controls the Direction of Microfluidic Movement

The experiment of Example 1 was repeated except that when the microchannel actuator was irradiated with a light, the direction of the attenuation of the light was adjusted by changing the direction in which the attenuator was placed.

It was found that the liquid in the microchannel actuator changed the direction of movement, and the movement process is as shown in FIG. 2 (see the movement process from 6 seconds to 9 seconds to 12 seconds).

Example 3

Microchannel Actuator Controls the Speed of Microfluidic Movement

The experiment of Example 1 was repeated except that the microchannel actuators were irradiated with light sources of different light intensities ($I_1$=125 mW cm$^{-2}$; $I_2$=100 mW cm$^{-2}$; $I_3$=60 mW cm$^{-2}$).

Figure 3:
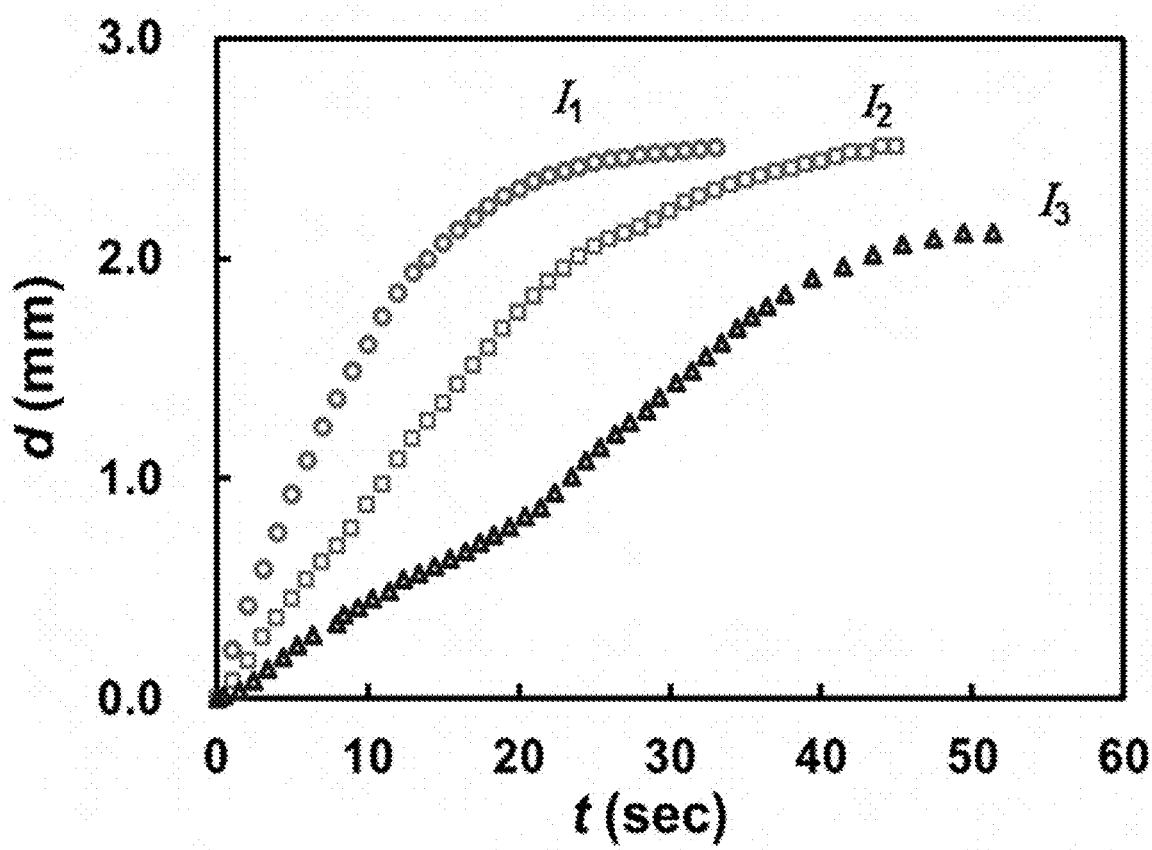
FIG. 3 shows the curve of the movement distance of micro-fluid versus time when the microchannel actuator is illuminated under lights having different intensities.

It is found that when the intensity of the light source became stronger, the moving speed was also gradually increased, and the results are shown in FIG. 3.

Moreover, it was found in experiments that when the intensity of the light source varies within the range of 0.01-10 W cm$^{-2}$, the speed of the liquid in the microchannel actuator changes, and the greater the light intensity, the higher the speed of movement.

Example 4

Microchannel Actuator Drives Microfluidic Movement Over a Long Distance

The experiment of Example 1 was repeated, and the liquid was controlled always in the radiation area of the light source. It was found that the liquid moved all the time and the distance of movement was unlimited.

Example 5

Figure 4:
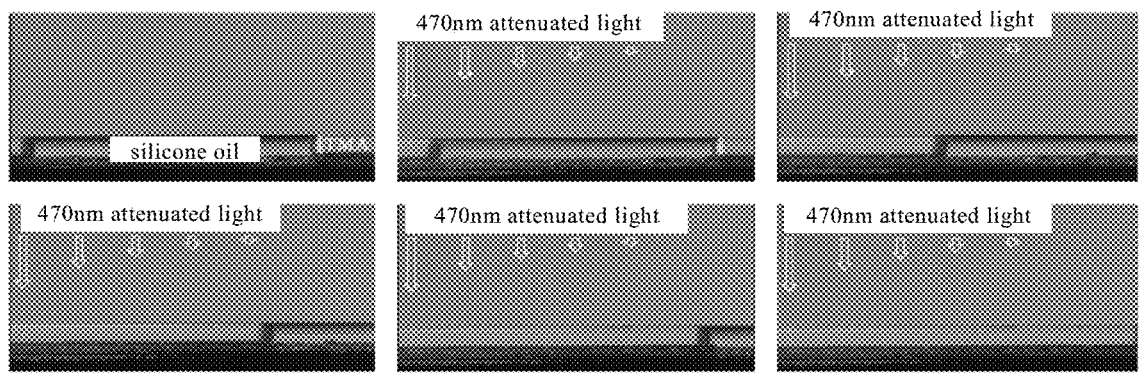
FIG. 4 shows that the microchannel actuator drives microfluidic movement when one end of micro-fluid is stimulated by an attenuated light.

Light Source Illuminates a Local Position of Liquid to Drive Microfluidic Movement The experiment of Example 1 was repeated. The liquid was changed to a longer length of silicone oil and the attenuated light was controlled to illuminate a local position of one end of liquid. It was found that the liquid can be driven by the attenuated light without illuminating the entire liquid, as shown in FIG. 4.

Example 6

Microchannel Actuator Drives Liquid to Climb

The straight microchannel actuators (inner diameter 0.5 mm, outer diameter 0.51 mm) prepared in Preparation Examples 1, 2, and 3 were fixed on a slope of 17 degrees. A small amount of silicone oil, n-hexane, ethyl acetate, or acetone was sucked into the microchannel actuator by capillary action. As in Example 1, the microchannel actuator was irradiated using an attenuated light source.

Figure 5:
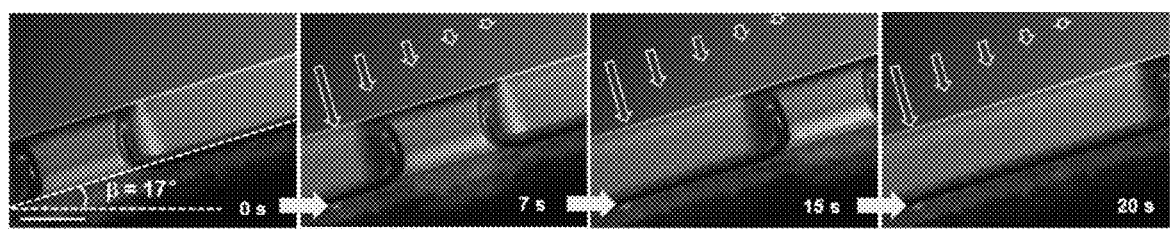
FIG. 5 shows that the microchannel actuator drives the liquid to climb against gravity under the stimulation of an attenuated light.

It was found that the microchannel actuator drove the micro-liquid to climb along the slope as shown in FIG. 5.

Example 7

Microchannel Actuator Drives Microfluidics to Generate Spiral Movement Track

The spiral microchannel actuator (inner diameter 0.6 mm, outer diameter 0.61 mm) prepared in Preparation Example 1 was fixed on a cylinder. A small amount of silicone oil was sucked into the spiral microchannel actuator by capillary action. The attenuated light source was used to radiate the micro-fluid in a direction perpendicular to the wall of the microchannel.

Figure 6:
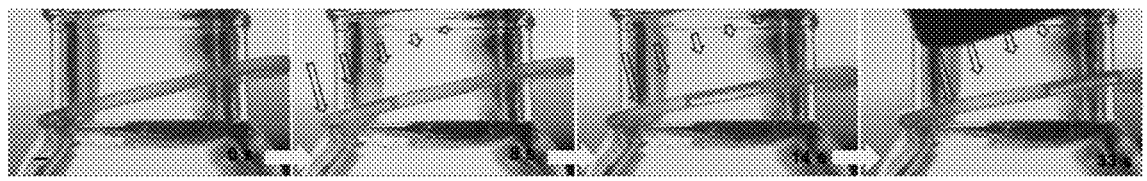
FIG. 6 shows the helical microchannel actuator drives liquid to move with helical trajectories under the stimulation of an attenuated light.

It was found that the micro-fluid moved in the spiral microchannel actuator, producing a spiral movement track, as shown in FIG. 6.

Example 8

The serpentine microchannel actuators (inner diameter 0.6 mm, outer diameter 0.61 mm) prepared in Preparation Examples 1, 2, and 3 were fixed on a horizontal table top. The silicone oil, n-hexane, ethyl acetate, or acetone was sucked into the serpentine microchannel actuator by capillary action. The attenuated light source was used to radiate the micro-fluid in a direction perpendicular to the wall of the microchannel.

Figure 7:
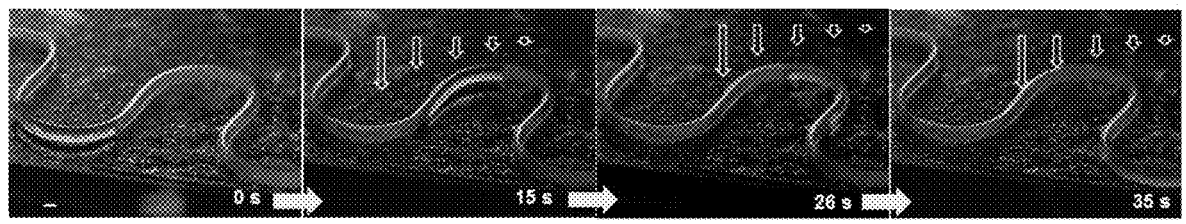
FIG. 7 shows that the micro-fluid move with an S-shaped trajectories in a serpentine microchannel actuator under the stimulation of an attenuated light.

It was found that the micro-fluid moved in the serpentine microchannel actuator, producing an S-shaped movement track, as shown in FIG. 7.

Example 9

Grooves were etched by chemical or physical means on a substrate, and then an azo polymer film was pasted on the substrate, so that fluid channels were formed between the substrate and the film. A point source was used to radiate one end of the micro-fluid.

Figure 9:
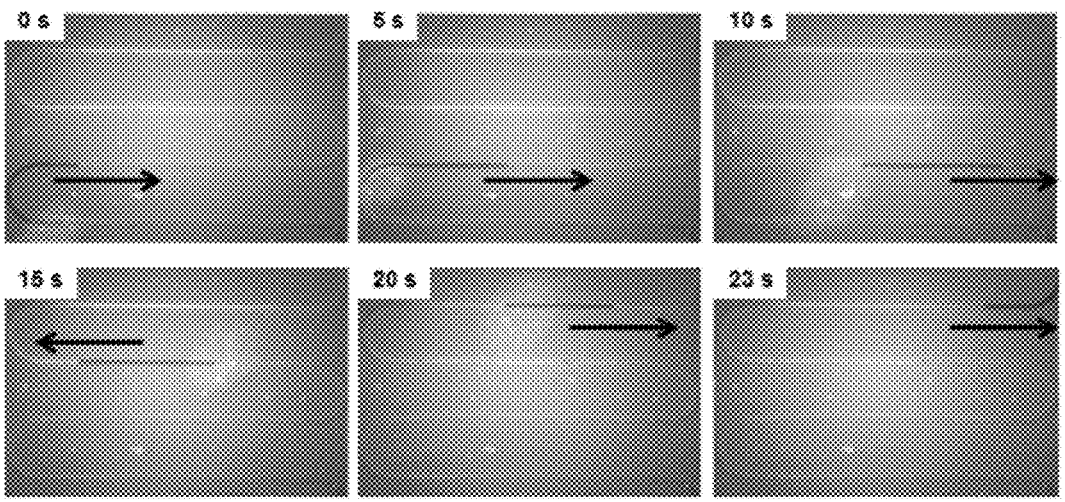
FIG. 9 shows that the micro-fluid is driven in the grooves formed by the substrate and the film under the stimulation of a moving light source.

Results shows that the micro-fluid moved in a direction opposite to the source in the channel and can achieve long-range movement through U-turns, as shown in FIG. 9.

Example 10

The inner wall of the straight microchannel actuator (inner diameter 0.5 mm, outer diameter 0.51 mm) prepared in Preparation Example 1 was coated with an aqueous solution of polyvinyl alcohol (0.01-9 wt %), and the microchannel actuator was fixed on the horizontal desktop after the solvent was evaporated. A trace amount of ethanol was drawn into the microchannel actuator by capillary action. A light source was placed above the microchannel actuator with an attenuator placed in the middle for generating an attenuated light. The light source was turned on, and the intensity of the light source was 125-140 mW cm$^{-2}$.

Results show that an asymmetrical deformation was generated in the straight microchannel actuator and drove the trace ethanol to move in the direction of light attenuation.

The aqueous solution of polyvinyl alcohol was replaced by a polyacrylamide aqueous solution or a silica sol-gel, results were the same as those in Example 8. An asymmetrical deformation was generated in the straight microchannel actuator and drove the trace amount of ethanol to move in the direction of light attenuation.

Example 11

The composite microchannel actuator (inner diameter 0.5 mm, outer diameter 0.51 mm) prepared in Preparation Example 2 was fixed on a horizontal table top. A trace amount of fluid such as silicone oil, ethyl acetate, ethylene glycol monobutyl ether or emulsion was sucked into the microchannel actuator by capillary action. A light source was placed above the microchannel actuator with an attenuator placed in the middle for generating an attenuated light. The light source was turned on, and the intensity of the light source was 125-140 mW cm$^{-2}$.

Results show that an asymmetrical deformation was generated in the straight microchannel actuator and drove the liquid to move in the direction of light attenuation.

In addition, the inventors have demonstrated through experiments that similar results can be obtained with microchannel actuators of the following sizes.

|  | Inner diameter | Outer diameter |
|---|---|---|
| Straight | 0.001-1.99 mm | 0.0012-2 mm |
| Serpentine | 0.001-1.99 mm | 0.0012-2 mm |
| Spiral | 0.001-1.99 mm | 0.0012-2 mm |
| Composite microchannel actuator | 0.001-1.99 mm | 0.0012-2 mm |
| Straight | 0.001-1.99 mm | 0.01-2 mm |
| Serpentine | 0.001-1.99 mm | 0.01-2 mm |
| Spiral | 0.001-1.99 mm | 0.01-2 mm |
| Composite microchannel actuator | 0.001-1.99 mm | 0.01-2 mm |

All documents mentioned in the present invention are incorporated herein by reference, as if each document were individually recited for reference. It is also to be understood that those skilled in the art can make various changes or modifications to the present invention upon reading of the above teachings of the present invention, and these equivalents also fall within the scope of the appended claims.

We claim:

1. A method for light-controlled microfluidic movement, comprising the steps of:
providing a microchannel actuator having a channel wall, wherein the microchannel actuator has an outer diameter of 0.0012-2 mm and an inner diameter of 0.001-1.99 mm, and wherein the material of the channel wall of the microchannel actuator is a polymer material containing an azobenzene group or an azo group;

loading a micro-fluid into the microchannel actuator; and illuminating one end of the micro-fluid-loaded microchannel actuator by a light source to drive the micro-fluid to move to an other end of the microchannel actuator; or illuminating the micro-fluid-loaded microchannel actuator with light sources of different intensities to drive the micro-fluid to move from an end receiving a high intensity light towards the direction of a low intensity light; and wherein the microchannel actuator undergoes asymmetric deformation under light stimulation, which induces capillary forces to drive microfluidic movement; and wherein illuminating the micro-fluid-loaded microchannel actuator causes the cross-sectional area of the microchannel actuator at the position of illumination to change, thereby driving the micro-fluid to move toward a thinner end of the microchannel actuator.

2. The method according to claim 1, wherein said microchannel actuator comprises a substrate having a groove and a film, and wherein said groove and film together form a fluid channel; and wherein said substrate and/or film contain an effective amount of the material of the channel wall.

3. The method according to claim 1, wherein the material of the channel wall is prepared by homopolymerization or copolymerization of CAB monomers; wherein the chemical structure of the monomer CAB is:

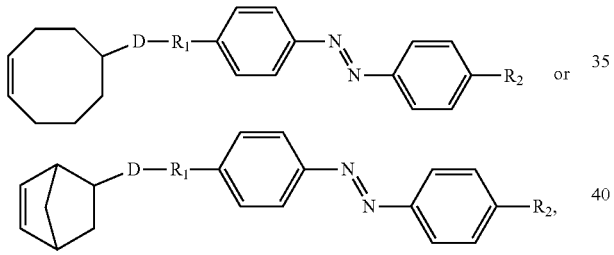

wherein, $R_2$ is H, a C1, C2, C3, C4, C5, or C6 hydrocarbyl or alkoxy, or a polar terminal group selected from the group consisting of a cyano, an isocyano, a hydroxyl, a halogen, an $R_1$ is a C3, C4, C5, C6, C7, C8, C9, C10, C11, or C12 hydrocarbyl or alkoxy;

wherein D is absent or present in the monomer, and wherein, when D is present, D is selected from the following structure formula (1)-structure formula (4):

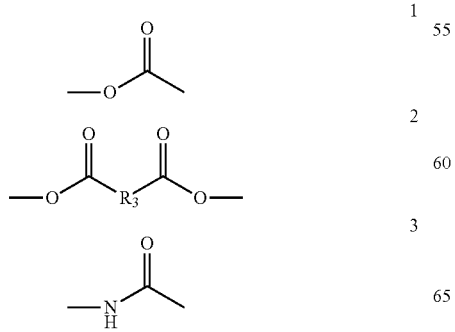

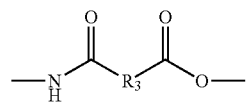

wherein $R_3$ is a C2, C3, C4, C5, or C6 hydrocarbyl or alkoxy.

4. The method according to claim 1, wherein the material of the channel wall is prepared by copolymerizing a CAB monomer with a CF monomer, wherein the chemical structure of the monomer CAB is:

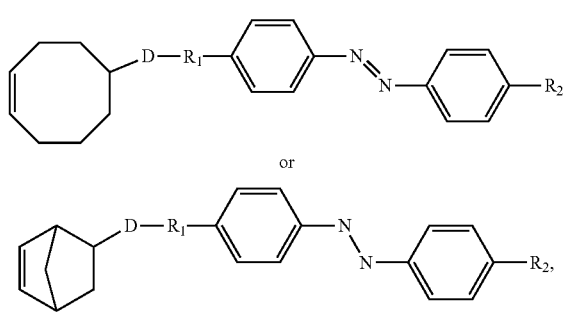

and wherein the chemical structure formula of the CF monomer is selected from the group consisting of:

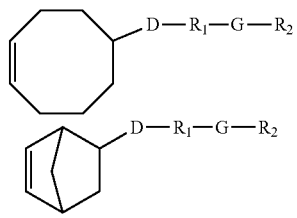

wherein, $R_2$ is H, a C1, C2, C3, C4, C5, or C6 hydrocarbyl or alkoxy, or a polar terminal group selected from the group consisting of a cyano, an isocyano, a hydroxyl, a halogen, an ester group, a carboxyl, a nitro, an amino and an amide group;

$R_1$ is a C3, C4, C5, C6, C7, C8, C9, C10, C11, or C12 hydrocarbyl or alkoxy;

wherein D is absent or present in the monomer, and wherein, when D is present, D is selected from the following structure formula (1)-structure formula (4):

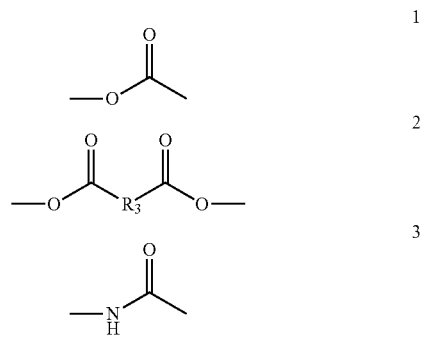

4

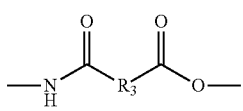

wherein R₃ is a C2, C3, C4, C5, or C6 hydrocarbyl or alkoxy, and wherein the structure of G is selected from the following structures or combinations thereof:

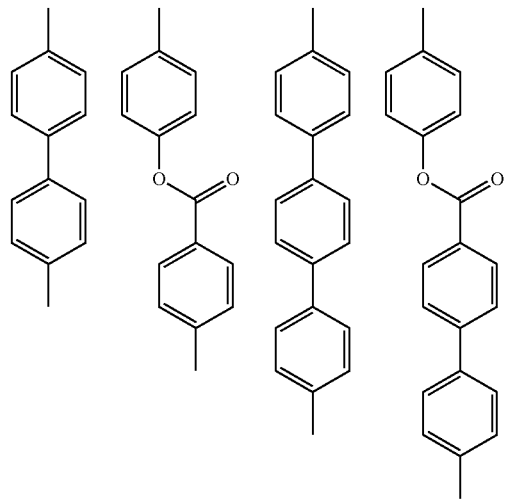

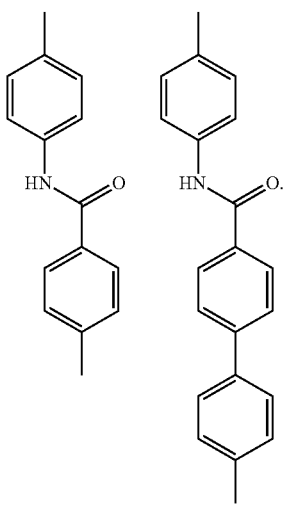

5. The method according to claim 3, wherein the material of the channel wall comprises a structural unit as follows:

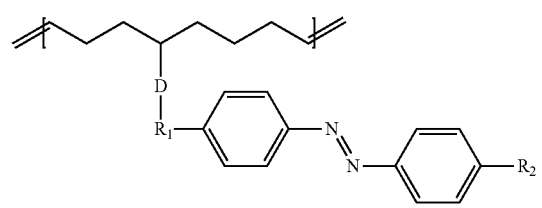

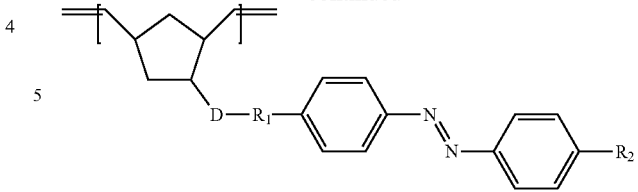

wherein, R₂ is H, a C1, C2, C3, C4, C5, or C6 hydrocarbyl or alkoxy, or a polar terminal group selected from the group consisting of a cyano, a isocyano, a hydroxyl, a halogen, an ester group, a carboxyl, a nitro, an amino and an amide group;

R₁ is a C3, C4, C5, C6, C7, C8, C9, C10, C11, or C12 hydrocarbyl or alkoxy;

D is selected from one of the following structure formula (1)-structure formula (4):

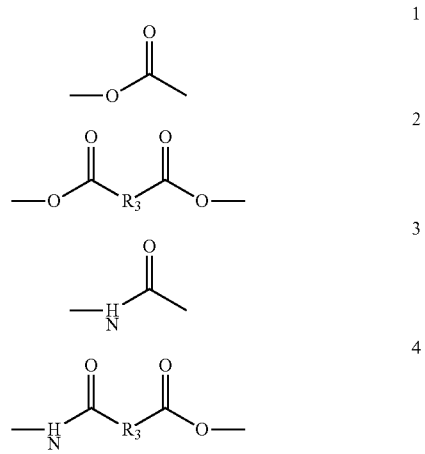

wherein, R₃ is a C2, C3, C4, C5 or C6 alkylene, alkenylene, alkynylene or an alkyleneoxy group.

6. The method according to claim 1, wherein the micro-fluid is a hydrophilic micro-fluid or a hydrophobic micro-fluid.

7. The method according to claim 1, wherein the micro-fluid is selected from the group consisting of organic liquids, water, aqueous solutions, gas-liquid fluids, liquid-solid fluids or emulsions.

8. The method according to claim 1, wherein the light source is selected from the group consisting of ultraviolet light, visible light, near infrared light and a combination thereof.

9. The method according to claim 1, wherein the method controls the direction of the microfluidic movement by controlling the direction of movement of the light or the direction of attenuation of the light.

10. The method according to claim 1, wherein the method adjusts the driving rate of the micro-fluid by controlling the intensity of the light source.

11. The method according to claim 1, wherein the whole or part of the material of the wall of the microchannel actuator is a polymer material containing an azobenzene group or an azo group.

12. The method according to claim 1, wherein the microchannel actuator further includes a composite layer wrapped around the inside and/or outside of the channel wall.

13. The method according to claim 1, wherein the microchannel actuator has an outer diameter of 0.01-2 mm.

14. A device for light-controlled microfluidic movement, comprising a light source and a microchannel actuator; wherein the microchannel actuator has a channel wall with an outer diameter of 0.0012-2 mm and an inner diameter is 0.001 to 1.99 mm, and the material of the channel wall of the microchannel actuator is a polymer material containing an azobenzene or azo group;
wherein the microchannel actuator undergoes asymmetric deformation under light stimulation, which induces capillary forces to drive microfluidic movement; and
wherein illuminating the micro-fluid-loaded microchannel actuator with a light source causes the cross-sectional area of the microchannel actuator at the position of illumination to change, thereby driving the micro-fluid to move toward a thinner end of the microchannel actuator.

15. The device according to claim 14, wherein the irradiation position of the light source can be moved along the microchannel actuator; and/or
an attenuator is placed between the light source and the microchannel actuator.

16. The device according to claim 14, wherein the microchannel actuator has an outer diameter of 0.01-2 mm.

17. The micro-channel actuator for light-controlled microfluidic movement according to claim 14, wherein the microchannel actuator has an outer diameter of 0.01-2 mm.

18. A micro-channel actuator for light-controlled microfluidic movement, comprising:
a microchannel actuator with a channel wall having an outer diameter of 0.0012-2 mm and an inner diameter of 0.001-1.99 mm, and wherein the material of the channel wall of the microchannel actuator is a polymer material containing an azobenzene or an azo group;
wherein the microchannel actuator undergoes asymmetric deformation under light stimulation, which induces capillary forces to drive microfluidic, movement; and
wherein illuminating the micro-fluid-loaded microchannel actuator with a light source causes the cross-sectional area of the microchannel actuator at the position of illumination to change, thereby driving the micro-fluid to move toward a thinner end of the microchannel actuator.

19. A microchannel actuator for light-controlled microfluidic movement, comprising:
a microchannel actuator with a channel wall having an outer diameter of 0.0012-2 mm and an inner diameter is 0.001 to 1.99 mm, and wherein the material of the channel wall of the microchannel actuator is a polymer material containing an azobenzene or an azo group.

* * * * *